United States Patent [19]

Kita et al.

[11] Patent Number: 4,496,509

[45] Date of Patent: Jan. 29, 1985

[54] METHOD OF PRODUCING CERAMIC TAPES

[75] Inventors: Katsuhiko Kita; Junzo Fukuda, both of Nagoya; Shiro Kawahito, Wakayama, all of Japan

[73] Assignees: Narumi China Corporation, Nagoya; Kao Soap Co., Ltd., Tokyo, both of Japan

[21] Appl. No.: 488,722

[22] Filed: Apr. 26, 1983

[30] Foreign Application Priority Data

Apr. 26, 1982 [JP] Japan ............................ 57-71086

[51] Int. Cl.³ .............................................. B32B 5/16
[52] U.S. Cl. ...................................... 264/175; 264/216
[58] Field of Search .................... 264/86, 63, 175, 216

[56] References Cited

U.S. PATENT DOCUMENTS 3,988,405 10/1976 Smith ...................................... 264/63
3,991,149 11/1976 Hurwitt ................................ 264/175
4,353,958 10/1982 Kita ....................................... 264/63
4,369,154 1/1983 Dougherty ............................ 264/63

Primary Examiner—John A. Parrish
Attorney, Agent, or Firm—Oblon, Fisher, Spivak, McClelland & Maier

[57] ABSTRACT

A method of preparing green ceramic tapes, comprising adding to 100 parts by weight of a fine ceramic powder, 2 to 15 parts by weight, in terms of its resin content, of a binder mixture consisting of an aqueous polyurethane and a water-soluble acrylic resin, the amount of said water-soluble acrylic resin ranging from 10 to 1500 parts by weight per 100 parts by weight of said aqueous polyurethane in said binder mixture, adding a small amount of a dispersing agent to the mixture followed by a sufficient amount of water, kneading the resultant mixture for a time sufficient to prepare an aqueous slip, forming a tape in a known manner from said aqueous, and then drying the green tape obtained.

10 Claims, 2 Drawing Figures

METHOD OF PRODUCING CERAMIC TAPES

BACKGROUND OF THE INVENTION

1. Field of the Invention

The present invention relates to an improved method of producing ceramic green tapes without using any organic solvent.

2. Description of the Prior Art

In general, ceramic green tapes, as noted by reference number 6 in FIG. 1, have in the past been prepared by dissolving a binder such as a butyral resin, an organic solvent-soluble acrylic resin or the like in an organic solvent such as methyl ethyl ketone, and mixing fine ceramic power with the solvent-resin mixture, followed by kneading of the resultant mass for an extended period of time to prepare a slip 2. Air entrapped in the slip is then removed and the slip in the device shown in FIG. 1 is passed through the lower portion of a so-called doctor knife 3 where it is deposited on a carrier film 4 to prepare a tape. Once the slip 2 is deposited, the tape is conveyed into a drying chamber 5 wherein it is heated to dryness.

However, because there are health problems associated with the use of organic solvents in the conventional preparative techniques, because the solvents result in offensive odors noticible by people living in the vicinity of the production facility and because there is an ever-present danger of explosion of vaporized solvent, new methods have recently been developed which employ an aqueous binder instead of an organic solvent. Among these methods is a manufacturing method (Japanese patent Laid-Open No. 113665/1980) which employs an aqueous polyurethane binder. This technique is attractive from the viewpoint that it makes it possible to obtain tough green tapes which feature a high charging density of the fine ceramic powder and a smooth surface. A need, however, continues to exist for an improved method of preparing green ceramic tapes of improved characteristics.

SUMMARY OF THE INVENTION

Accordingly, one object of the present invention is to provide an improved method of preparing green ceramic tapes which does not employ an organic solvent in the manufacturing process.

Another object of the present invention is to provide a method of providing green ceramic tapes of varying degrees of hardness.

Briefly, these objects and other objects of the present invention as hereinafter will become more readily apparent can be attained by a method of preparing green ceramic tapes by adding to 100 parts by weight of a fine ceramic powder, 2 to 15 parts by weight, in terms of its resin content, of a binder mixture consisting of an aqueous polyurethane and a water-soluble acrylic resin, the amount of said water-soluble acrylic resin ranging from 10 to 1500 parts by weight per 100 parts by weight of said aqueous polyurethane in said binder mixture, adding a small amount of a dispersing agent to the mixture followed by a sufficient amount of water, kneading the resultant mixture for a time sufficient to prepare an aqueous slip, forming a tape in a conventional manner from said aqueous slip and then drying the green tape obtained.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
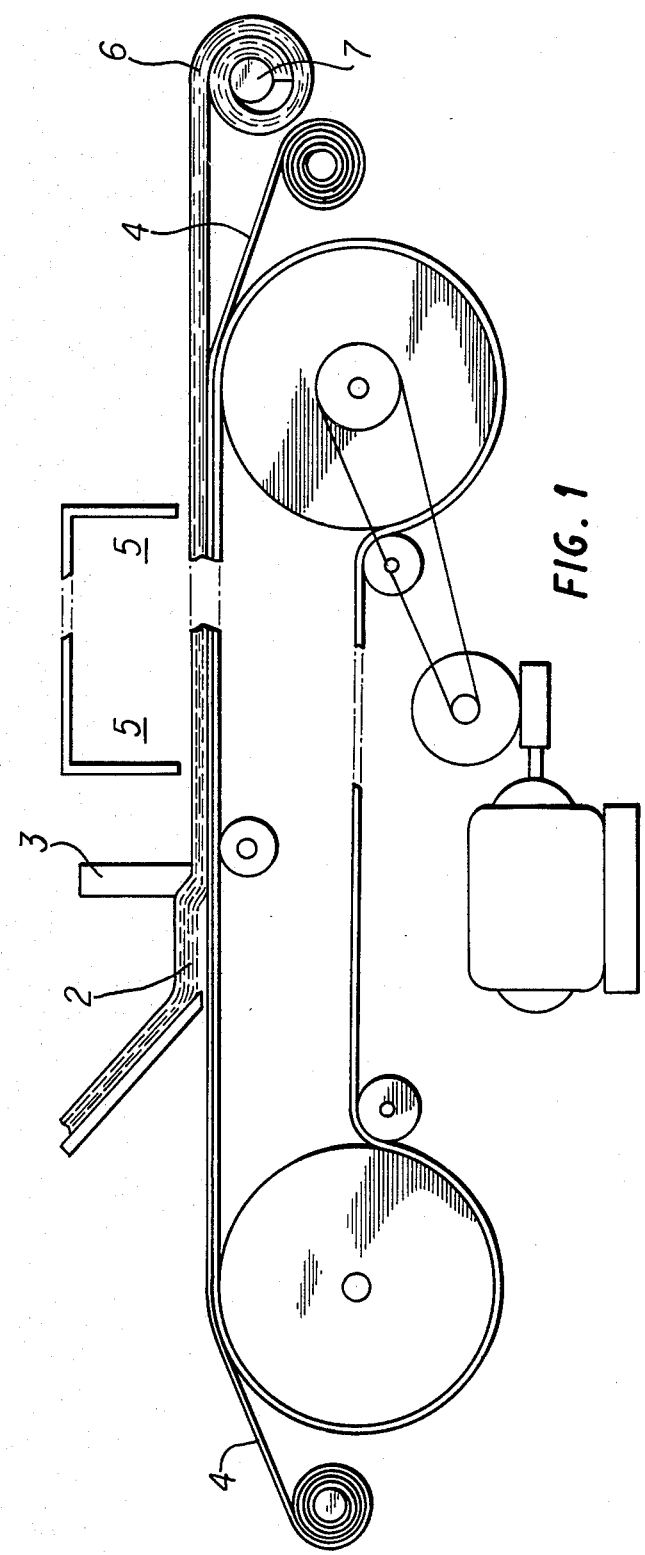
FIG. 1 is a schematic diagram of the device employed to prepare the present green tape.

The heart of the process of the present invention is the use of an aqueous polyurethane binder in the production of the green ceramic tapes of excellent properties and in high productivity. The objective of the present invention is achieved in a process of preparing greem ceramic tapes by adding to 100 parts by weight of a fine ceramic powder, 2 to 15 parts by weight, in terms of its resin content, of a binder mixture consisting of an aqueous polyurethane and a water-soluble acrylic resin, the amount of said water-soluble acrylic resin ranging from 10 to 1500 parts by weight per 100 parts by weight of said aqueous polyurethane in said binder mixture, adding a small amount of a dispersing agent to the mixture followed by a sufficient amount of water, kneading the resultant mixture for a time sufficient to prepare an aqueous slip, forming a tape in a conventional maner from the aqueous slip, and drying the green tape obtained. The green ceramic tape produced by the method of the present invention does not warp at the ends during the baking step and, hence, can be manufactured in high productivity.

The binder mixture of the present invention consists of an aqueous polyurethane admixed with a water-soluble acrylic resin, or it consists of an aqueous polyurethane which is partially replaced by a water-soluble acrylic resin. In the present binder, the water-soluble acrylic resin is present in the binder in an amount of 10 to 1500 parts by weight per 100 parts by weight of the aqueous polyurethane. If the amount of the water-soluble acrylic resin in the binder is less than 10 parts by weight, the ends of the green tape become warped when it is baked. On the other hand, if the amount of the water-soluble acrylic resin in the binder is greater than 1500 parts by weight, again, the ends of the baked tape become warped. Furthermore, the high charging density of the fine ceramic powder in the aqueous polyurethane is lost.

In the present slip formulation the amount of the binder mixture ranges from 2 to 15 parts by weight, in terms of the resin content, per 100 parts by weight of the fine ceramic powder. If the amount of binder is less than 2 parts by weight, the green tape will easily crack, while if the amount of the binder is greater than 15 parts by weight, many voids are formed and the high charging density of the ceramic powder is lost.

Suitable examples of the aqueous polyurethane used in the present binder include polyurethanes and polyurethane ureas which are stable in an aqueous medium such as polyurethane emulsion, a water-soluble polyurethane, a polyurethane dispersion, a polyurethane microemulsion and the like, which can be prepared by a variety of methods. Representative methods of preparing aqueous polyurethanes include:

(1) reacting a polyhydroxyl compound such as a polyester, a polyacetal, a polyester amide or a polythioether obtained by the dehydrating condensation reaction of a polyhydric alcohol such as a polyether, an ethylene glycol, a propylene glycol, a butanediol or a hexanediol which is a polymer or copolymer of tetrahydrofuran, propylene oxide or ethylene oxide with a polyfunctional carboxylic acid such as maleic acid, succinic acid, adipic acid or phthalic acid; with a polyisocyanate such as an aromatic polyisocyanate of which 1,5-naphthylene diisocyanate, 4,4'-diphenylmethane diisocyanate, phenylene diisocyanate, and tolylene diisocyanate are examples, or an aliphatic diisocyanate such as hexamethylene diisocyanate, dicyclohexylmethane diisocyanate or xylylene diisocyanate; and a polyhydric alcohol and a chain extender such as a low-molecular polyamine of which ethylenediamine, propylenediamine, diethylenetriamine, hexamethylenediamine, and xylylenediamine are examples, in an inert organic solvent such as tetrahydrofuran, acetone, methyl ethyl ketone, ethyl acetate or toluene thereby obtaining a urethane polymer solution;

placing the thus obtained urethane polymer solution in water which contains a suitable amount of an emulsifier; and then removing the inert organic solvent by distillation;

(2) extending the chain of a free isocyanate group-containing urethane prepolymer which is prepared from a polyhydroxyl compound and an excess of polyisocyanate in water which contains an activated hydrogen compound such as a low-molecular weight polyamine or polyhydric alcohol, and an emulsifier, followed by emulsification;

(3) emulsifying a urethane prepolymer containing free isocynanate groups in water using tertiary amines as a catalyst, and then extending the chain with water;

(4) obtaining a compound having terminal amino groups by reacting a prepolymer having terminal hydroxyl groups prepared from a polyhydroxyl compound with a polyisocyanate or by reacting a urethane prepolymer having terminal isocyanate groups with diamines, emulsifying the reaction product in water using an emulsifier followed by the addition of a polyisocycnate;

(5) reacting a urethane polymer containing halogen groups or sulfonic acid groups with a tertiary amine, and admixing the reaction product with water;

(6) reacting the hydroxyl or amino group of a polyurethane containing primary and/or secondary hydroxyl groups and/or amino groups with a compound which forms a salt after the ring has been opened such as a cyclic dicarboxylic acid anhydride, sultone or lactone, and neutralizing the reaction product with a base followed by mixing of the reaction product with water;

(7) chain-extending of a urethane prepolymer having isocyanate groups on its terminals prepared from a water-soluble polyhydroxyl compound and a polyisocyanate in an aqueous solution of polyfunctional amines;

(8) reacting a urethane prepolymer having isocyanate groups on its terminals with an aqueous solution of a compound having amino or hydroxyl groups and sulfonic or carboxyl groups such as an alkali or ammonium salt of a diaminocarboxylic acid, to extend the chain while effecting the emulsification;

(9) reacting a polyoxyethylene glycol or propylene oxide with a water-soluble glycol which is a ring-opened copolymer of ethylene oxide and with a polyisocyanate;

(10) mixing a urethane prepolymer containing carboxyl and isocyanate groups prepared from a polyhydroxyl compound having carboxyl groups and a polyisocyanate with a basic aqueous solution, to effect neutralization as well as chain extension with water or low-molecular weight polyamines;

(11) reacting a urethane prepolymer having isocyanate groups on its terminals with a polyalkylenepolyamine such as diethylenetriamine to prepare a polyurethane urea polyamine, reacting the thus obtained polyurethane urea polyamine, or an alkyl ($C_{12}$–$C_{22}$) isocyanate adduct thereof, or an epihalohydrin adduct thereof with a cyclic dicarboxylic acid anhydride, and mixing an aqueous solution of a basic substance with the reaction product;

(12) reacting a polyurethane urea polyamine or a epihalohydrin adduct thereof with a sulfone, or a lactone, or with a sodium monohalogenocarboxylate, or with a (meth)acrylic acid ester or acrylonitrile, followed by hydrolysis, and then mixing the reaction product with water; and

(13) reacting a urethane prepolymer having isocyanate groups on its terminals obtained from a polyhydroxyl compound including polyoxyethylene glycol and a polyisocyanate, with a polyalkylenepolyamine such as diethylenetriamine to prepare a polyurethane urea polyamine, followed by mixing the reaction product with water immediately thereafter or after an epihalohydrin has been added to the polyurethane urea polyamine.

The water-soluble acrylic resin component of the present binder is obtained by reacting ammonia or an aqueous solution of an organic amine with a homopolymer of an ethylenically unsaturated carboxylic acid, a copolymer of an ethylenically unsaturated carboxylic acid and an acrylic monomer, or a copolymer of an ethylenically unsaturated carboxylic acid, an acrylic monomer, and an ethylenically unsaturated monomer which is copolymerizable therewith.

Suitable examples of the ethylenically unsaturated carboxylic acids include mono- and dicarboxylic acids such as acrylic acid, α-chloroacrylic acid, methacrylic acid, itaconic acid, maleic anhydride, maleic acid, fumaric acid, and the like.

Suitable examples of the acrylic monomers include acrylate monomers such as methyl acrylate, ethyl acrylate, n-propyl acrylate, isopropyl acrylate, n-butyl acrylate and isobutyl acrylate; methacrylate monomers such as methyl methacrylate, ethyl methacrylate, n-propyl methacrylate, isopropyl methacrylate, n-butyl methacrylate and isobutyl methacrylate; and acrylamide or methacrylamide monomers such as acrylamide, N-methylolacrylamide, methacrylamide, N-methylolmethacrylamide, diacetone acrylamide, and diacetone methacrylamide.

Suitable examples of the ethylenically unsaturated monomers include aromatic monomers such as styrene and vinyltoluene, vinyl carboxylates such as vinyl acetate and vinyl propionate, and unsaturated nitriles such as acrylonitrile and methacrylonitrile.

Ammonia and the organic amines used for water-solubilization include dimethylamine, trimethylamine, diethylamine, triethylamine, diisopropylamine, monoethanolamine, diethanolamine, triethanolamine, monoisopropanolamine, diisopropanolamine, triisopropanolamine, N-methylethanolamine, N-aminoethylethanolamine, N-methyldiethanolamine, and the like.

The water-soluble acrylic resin component of the present binder can be prepared by any conventional polymerization method. In particular, the emulsions obtained by emulsion polymerization methods which do not use a solvent are not only advantageous economically, but also dissolve easily and very quickly in aqueous alkaline solutions.

The water-soluble acrylic resin component of the present binder can also be prepared by hydrolyzing the formed polymer and reacting the hydrolyzate with an aqueous alkaline solution.

To put the method of the present invention into practice, the aqueous polyurethane and the water-soluble acrylic resin component must be uniformly mixed together. For this purpose, it is essential to mix the components with a suitable dispersing agent. The dispersing agent should be of a non-ionic type or should have an electric charge of the same polarity as the binder, to prevent gelation of the binder.

Suitable dispersing agents which can be utilized for this purpose, i.e., those which are suitable for making the aqueous polyurethane and the water-soluble acrylic resin compatible with each other include polyoxyethylene alkyl ethers or polyoxyalkylenephenol ethers. Polyoxyethylene nonylphenol ether (HLB value 17.5) is particularly satisfactory as the dispersing agent. The dispersing agent should be added in an amount of 0.01 to 3%, most desirably 1%, per 100 parts by weight of the fine ceramic powder.

The water which is present in the binder mixture should be de-ionized so that the dispersibility of the ceramic powder does not deteriorate because of the presence of ions in the binder mixture. Furthermore, a water-soluble organic solvent such as ethyl alcohol, ethylene glycol or the like may be added to water.

By the process of the present invention, soft green ceramic tapes can be obtained which range from soft to hard, the degree of softness or hardness being dependent on the kind of aqueous polyurethane and water-soluble acrylic resin used, as well as the blending ratio or the binder components.

Having generally described the invention, a further understanding can be obtained by reference to certain examples which are provided herein for purposes of illustration only and are not intended to be limiting unless otherwise specified.

Embodiments of the invention are shown in the Examples of Table 1 together with Comparative Examples. Test Nos. 1 to 8 represent Examples of the invention and Test Nos. 9 to 12 represent Comparative Examples. In Table 1, the amounts of ingredients are expressed as parts by weight.

In all of the tests, the aqueous polyurethane has a resin content of 25% and the water-soluble acrylic resin has a resin content of 30%.

In the tests of Nos. 1 to 7 and 9 to 12, alumina having an average particle size of $2\mu$ and a purity of 96% was used as the fine ceramic powder, and the aqueous polyurethane, the water-soluble acrylic resin, the dispersing agent, and de-ionized water were blended together in the ratios shown in Table 1, so that the slip viscosity was nearly the same in all of the tests.

In test No. 8, the dry green tape prepared in test No. 2 was mixed with the starting material in an amount of 10 parts per 100 parts of the fine alumina powder.

Polyoxyethylene nonylphenol ether (HLB 17.5) was used as the dispersing agent in each of the tests.

In each of the tests, the starting materials were introduced into a ball mill made of alumina and were kneaded for about 16 hours using alumina balls of an amount about twice that of the starting materials thereby resulting in the preparation of aqueous slips. Bubbles in the slip were removed using a vacuum defoaming device, followed by drying to obtain a green tape having a thickness of 0.8 mm.

Figure 2:
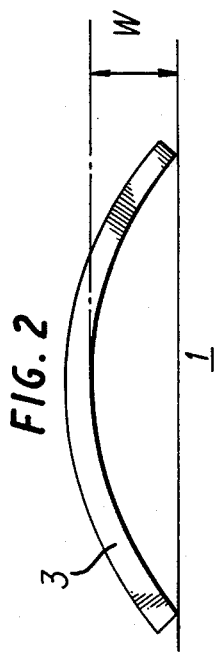
FIG. 2 is a side view of a baked and warped ceramic substrate.

Specimens of the green tapes were placed piece by piece on a setter made of alumina with no load, and were baked at a temperature of 1570° C. in the open air. The baked specimen tapes were square having a width of about 50 mm. The extent of warping of the baked tape samples of Table 1 is indicated for each tape by the symbol as shown in FIG. 2. A warped green tape sample (3) is shown on horizontal surface 1.

| Test No. | 1 | 2 | 3 | 4 | 5 | 6 | 7 | 8 | 9 | 10 | 11 | 12 |
|---|---|---|---|---|---|---|---|---|---|---|---|---|
| Alumina (parts) | 100 | 100 | 100 | 100 | 100 | 100 | 100 | 100 | 100 | 100 | 100 | 100 |
| Dry green tape (parts) | 0 | 0 | 0 | 0 | 0 | 0 | 0 | 0 | 0 | 0 | 0 | 0 |
| Aqueous polyurethane (parts) | 24.0 | 20.0 | 16.0 | 12.0 | 8.0 | 4.0 | 2.0 | 20.0 | 28.0 | 26.0 | 1.5 | 0 |
| Water-soluble acrylic resin (parts) | 3.3 | 6.7 | 10.0 | 13.3 | 16.7 | 20.0 | 21.7 | 6.6 | 0 | 1.7 | 22.1 | 23.3 |
| Water-soluble acyrylic resin/aqueous polyurethane ratio | 17% | 40% | 75% | 133% | 250% | 600% | 1300% | 40% | 0% | 7.7% | 1767% | — |
| Dispersing agent (parts) | 1 | 1 | 1 | 1 | 1 | 1 | 1 | 1 | 1 | 1 | 1 | 1 |
| De-ionized water (parts) | 11.7 | 14.3 | 17.4 | 20.3 | 23.7 | 27.5 | 28.7 | 17.0 | 9.5 | 10.5 | 29.5 | 30.7 |
| Density of green tape (g/cm$^3$) | 2.21 | 2.23 | 2.19 | 2.14 | 2.14 | 2.10 | 2.08 | 2.22 | 2.21 | 2.21 | 2.04 | 2.04 |
| Extent of warping of baked tape W (mm) | 0.1 or less | 0.1 or less | 0.1 or less | 0.1 or less | 0.1 or less | 0.1 or less | 0.1 or less | 0.1 or less | 0.5 | 0.4 | 0.3 | 0.4 |

In Examples 1 to 8 of the present invention, the baked tapes are warped to an extent of less than 0.1 mm, which represents a great improvement over the extent of warping of the types of the Comparative Examples which ranges from 0.3 to 0.5 mm. In Example 8, the tape was also examined to determine if the green tape, once dried, could be used again to prepare a slip. It was found that the green tape would easily disperse again in water. Accordingly, the tape of Example 8 exhibits no change in characteristics in comparison to the tape of Example 2, which has the same composition as that of Example 8 except that it does not contain dried green tape. This fact indicates that the method of the present invention can be adapted for the reuse of the dried green tape.

Summarized below are the functions and effects of the present invention in which an aqueous polyurethane is added to a water-soluble acrylic resin, or the water-soluble acrylic resin is partially replaced by the aqueous polyurethane. That is, when a conventional aqueous slip is dried and solidified to form a tape, the density of the ceramic particles tends to become non-uniform in a direction of the thickness of the tape while the tape solidifies. Therefore, the baked tape exhibits different degrees of shrinking at the front surface layer and at the back surface layer. Consequently, the baked tape tends to warp.

The baked tape can be used as a substrate for thick-film IC's and it is an important requirement that the ends of the baked tape not warp. In baking the green tapes, therefore, it has thus far been necessary to place, for example, a weight on green tapes to prevent them from warping. On the other hand, when the ceramic particles are uniformly charged in the direction of the thickness of the tape, when it is being dried according to the method of the present invention, the extent of warping can be reduced to below 0.1 mm in the case of a square specimen having a width of 50 mm without the need of placing any weight on the tape when it is being baked. Furthermore, since the water-soluble acrylic resin is added to the binder or since the aqueous polyurethane is partially replaced by the water-soluble acrylic resin, the green tape exhibits a larger solubility in water than when the aqueous polyurethane alone is used. That is, the green tape which is dried and solidified disperses well again in water. Accordingly, the dried green tape chips can be put into reuse easily, although this was not possible prior to the present invention. Thus, the method of the present invention effectively utilizes resources and reduces manufacturing costs.

As described below, the method of the present invention which employs an aqueous binder makes it possible to obtain excellent products, i.e., green ceramic tapes which can be advantageously manufactured on an industrial scale.

Having now fully described this invention, it will be apparent to one of ordinary skill in the art that many changes and modifications can be made thereto without departing from the spirit or scope of the invention as set forth herein.

What is claimed as new and is intended to be secured by Letters Patent of the United States is:

1. A method of preparing green ceramic tapes, comprising:

adding to 100 parts by weight of a fine ceramic powder, 2 to 15 parts by weight, in terms of its resin content, of a binder mixture consisting of an aqueous polyurethane and a water-soluble acrylic resin, the amount of said water-soluble acrylic resin ranging from 10 to 1500 parts by weight per 100 parts by weight of said aqueous polyurethane in said binder mixture;

adding a small amount of a dispersing agent to the mixture followed by a sufficient amount of water;

kneading the resultant mixture for a time sufficient to prepare an aqueous slip;

forming a tape from said aqueous slip; and then drying the green tape obtained.

2. The method of claim 1, wherein said water-soluble acrylic resin is obtained by reacting ammonia or an aqueous organic amine solution with a homopolymer of an ethylenically unsaturated carboxylic acid, a copolymer of an ethylenically unsaturated carboxylic acid and an acrylic monomer or a copolymer of an ethylenically unsaturated carboxylic acid, an acrylic monomer or an ethylenically unsaturated monomer copolymerizable therewith.

3. The method of claim 2, wherein said ethylenically unsaturated carboxylic acid is acrylic acid, 2-chloroacrylic acid, methacrylic acid, itaconic acid, maleic anhydride, maleic acid or fumaric acid.

4. The method of claim 2, wherein said acrylic monomer is methyl (meth)acrylate, ethyl (meth)acrylate, n-propyl (meth)acrylate, isopropyl (meth)acrylate, n-butyl (meth)acrylate, isobutyl (meth)acrylate, acrylamide, N-methylolacrylamide, methacrylamide, N-methylolmethacrylamide, diacetone acrylamide or diacetone methacrylamide.

5. The method of claim 2 wherein said ethylenically unsaturated monomer is styrene, vinyltoluene, vinyl acetate, vinyl propionate, acrylonitrile or methacrylonitrile.

6. The method of claim 2 wherein said organic amine is dimethylamine, trimethylamine, diethylamine, triethylamine, diisopropylamine, monoethanolamine, diethanolamine, triethanolamine, monoisopropanolamine, diisopropanolamine, triisopropanolamine, N-methylethanolamine, N-aminoethylethanolamine, or N-methyldiethanolamine.

7. The method of claim 1, wherein the polymeric components of said binder are emulsified with a dispersing agent selected from the group consisting of polyoxyethylene alkyl ether or a polyoxyalkylene phenol ether.

8. The method of claim 7, wherein the amount of dispersing agent ranges from 0.01 to 3% per 100 parts by weight of the fine ceramic powder.

9. The method of claim 1, wherein the binder mixture further contains a water-soluble organic solvent.

10. The method of claim 1, wherein said aqueous polyurethane component is a polyurethane emulsion, water-soluble polyurethane, a polyurethane dispersion or a polyurethane microemulsion.

* * * * *